US012759068B2

(12) United States Patent
Hatada et al.

(10) Patent No.: US 12,759,068 B2
(45) Date of Patent: Oct. 13, 2026

(54) LASER BRAZING SYSTEM

(71) Applicant: FANUC CORPORATION, Yamanashi (JP)

(72) Inventors: Masanobu Hatada, Yamanashi (JP); Hiromitsu Takahashi, Yamanashi (JP); Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 863 days.

(21) Appl. No.: 18/006,866

(22) PCT Filed: Jul. 27, 2021

(86) PCT No.: PCT/JP2021/027742
§ 371 (c)(1),
(2) Date: Jan. 25, 2023

(87) PCT Pub. No.: WO2022/025058
PCT Pub. Date: Feb. 3, 2022

(65) Prior Publication Data

US 2023/0264283 A1 Aug. 24, 2023

(30) Foreign Application Priority Data

Jul. 31, 2020 (JP) ................................ 2020-131003

(51) Int. Cl.
*B23K 1/005* (2006.01)
*B23K 26/08* (2014.01)

(52) U.S. Cl.
CPC ........ *B23K 1/0056* (2013.01); *B23K 26/0884* (2013.01)

(58) Field of Classification Search
CPC .... B23K 26/38; B23K 26/032; B23K 26/142; B23K 26/1437; B23K 26/14;
(Continued)

(56) References Cited

U.S. PATENT DOCUMENTS 6,696,668 B2 * 2/2004 Hayakawa ............. B25J 9/1697 219/121.84
2001/0054637 A1 12/2001 Hayakawa
2016/0267806 A1 * 9/2016 Hsu ...................... B23K 9/0956

FOREIGN PATENT DOCUMENTS

CN 105163913 A 12/2015
CN 107891215 A 4/2018
(Continued)

OTHER PUBLICATIONS

International Search Report issued in PCT/JP2021/027742; mailed Oct. 26, 2021.

*Primary Examiner* — Chris Q Liu
(74) *Attorney, Agent, or Firm* — Studebaker Brackett PLLC

(57) ABSTRACT

Provided is a laser brazing system that can collectively control a robot and devices such as a laser oscillator and a wire feeding device and that can also collectively display the state of the robot and the state of the devices. A laser brazing system 1 that comprises a gas supply device 16, a wire feeding device 17, a laser oscillator 15, a robot 12 that supports a wire feeding nozzle 14 and a laser processing head 13 on the tip of an arm 121, and a robot control device 10 that controls the robot 12. In addition to the robot 12, the robot control device 10 of the laser brazing system 1 controls the wire feeding device 17, the gas supply device 16, and the laser oscillator 15 and has an operation panel 11 that includes a display unit 112 that can display the state of at least one of the wire feeding device 17, the gas supply device 16, and the laser oscillator 15.

10 Claims, 6 Drawing Sheets

(58) Field of Classification Search

CPC ...... B23K 26/147; B23K 26/03; B23K 26/12; B23K 26/1436; B23K 26/1462; B23K 26/702; B23K 1/0056; B23K 26/046; B23K 26/048; B23K 26/083; B23K 26/0869; B23K 26/0884; B23K 26/1435; B23K 26/1476; B23K 26/348; B23K 26/354; B23K 26/36; B23K 26/02; B23K 26/0344; B23K 26/04; B23K 26/042; B23K 26/044; B23K 26/0626; B23K 26/0643; B23K 26/0648; B23K 26/0853; B23K 26/0876; B23K 26/128; B23K 26/20; B23K 26/382; B23K 26/389; B23K 26/70; B23K 26/705; B23K 26/707

USPC .......................... 219/121.83, 121.84, 121.85

See application file for complete search history.

(56) References Cited

FOREIGN PATENT DOCUMENTS

| | | | |
|---|---|---|---|
| DE | 10 2017 009 043 | A1 | 4/2018 |
| JP | H04-228283 | A | 8/1992 |
| JP | H09-308960 | A | 12/1997 |
| JP | 2000-344420 | A | 12/2000 |
| JP | 2002-001521 | A | 1/2002 |
| JP | 2003-205382 | A | 7/2003 |
| JP | 2005-211915 | A | 8/2005 |
| JP | 2009-208126 | A | 9/2009 |
| JP | 2011-045898 | A | 3/2011 |
| JP | 2011-152582 | A | 8/2011 |
| JP | 2013-128939 | A | 7/2013 |
| JP | 2014-000600 | A | 1/2014 |
| JP | 2014-104561 | A | 6/2014 |
| JP | 2014-198373 | A | 10/2014 |
| JP | 2018-140408 | A | 9/2018 |
| JP | 2019-081181 | A | 5/2019 |

* cited by examiner

FIG .4

1:BRAZING (GAS FLOW RATE COMMAND = 10 CCM, GAS FLOW RATE COMMAND TIMING = 0 msec, WIRE FEED SPEED COMMAND = 100 cm/sec, WIRE FEED SPEED COMMAND TIMING = 200 msec, LASER PREHEATING COMMAND = 500 W, LASER PREHEATING COMMAND TIMING = 100 msec, LASER POWER COMMAND = 1000 W, LASER POWER COMMAND TIMING = 200 msec, LASER POWER COMMAND INCREASE/DECREASE MANNER = RAMP UP)

LASER BRAZING SYSTEM

TECHNICAL FIELD

The present disclosure relates to a laser brazing system.

BACKGROUND ART

Known conventional laser brazing systems perform brazing using a laser as a heat source and a wire as a molten material for brazing. Especially in recent years, robotic laser brazing systems have been increasingly used in automotive manufacturing and other industries.

A robotic laser brazing system typically includes: a laser processing head having a laser oscillator; a wire feeder having a wire feed nozzle for feeding a wire; and a robot having an arm that supports the laser processing head and the wire feed nozzle (see, for example, Patent Document 1).

Patent Document 1: Japanese Unexamined Patent Application, Publication No. 2003-205382

DISCLOSURE OF THE INVENTION

Problems to be Solved by the Invention

However, in the conventional robotic laser brazing system, devices other than the robot, such as the laser oscillator and the wire feeder, are controlled by an external device such as a PLC, which is a different device from a robot controller that controls the robot. Such a configuration can cause, for example, a communication delay, making it difficult to accurately synchronize control of wire feeding, laser irradiation, and other operations with control of robot driving.

Furthermore, since the robot controller and the external device such as a PLC that controls the devices such as the laser oscillator and the wire feeder are provided separately, it is impossible to collectively display the state of each device such as the laser oscillator and the wire feeder, and the state of the robot, making it difficult for an operator to know the state of each device and the state of the robot at once.

It is therefore desirable to provide a laser brazing system that can collectively control a robot and other devices such as a laser oscillator and a wire feeder, and that can collectively display the state of each device and the state of the robot.

Means for Solving the Problems

An aspect of the present disclosure is directed to a laser brazing system including: a gas supply device configured to supply gas; a wire feeder configured to feed a wire; a laser oscillator configured to lase; a wire feed nozzle; a laser processing head; a robot having an arm that supports, on a distal end thereof, the wire feed nozzle and the laser processing head; and a robot controller configured to control the robot, the robot controller being configured to control, in addition to the robot, the wire feeder, the gas supply device, and the laser oscillator, and having a display unit enabled to display a state of at least one of the wire feeder, the gas supply device, or the laser oscillator.

Effects of the Invention

According to the foregoing aspect of the present disclosure, it is possible to provide a laser brazing system that can collectively control a robot and other devices such as a laser oscillator and a wire feeder, and that can collectively display the state of each device and the state of the robot.

BRIEF DESCRIPTION OF THE DRAWINGS

FIG. 4 is a diagram showing an example of a robot program according to the embodiment of the present disclosure in which the initiation sequence shown in FIG. 2 is written in a single-line instruction;

PREFERRED MODE FOR CARRYING OUT THE INVENTION

The following describes an embodiment of the present disclosure in detail with reference to the drawings.

Figure 1:
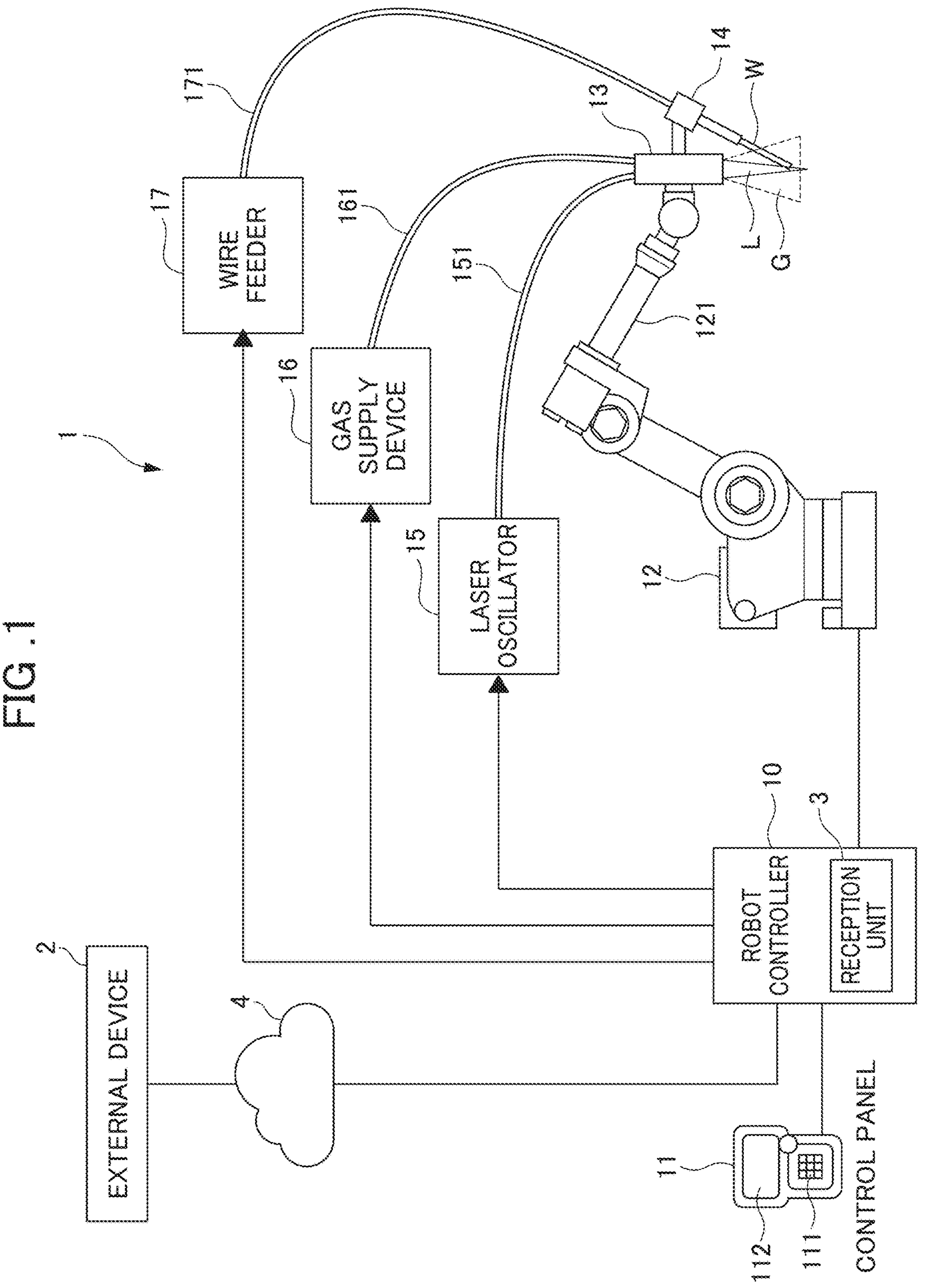
FIG. 1 is a diagram illustrating a configuration of a laser brazing system according to an embodiment of the present disclosure.

FIG. 1 is a diagram illustrating a configuration of a laser brazing system 1 according to the embodiment of the present disclosure. Note here that brazing is a type of metal joining process. An alloy (molten material for brazing, brazing material) having a lower melting point than base metals to be joined is melted and diffused between the base metals. The alloy then cools and solidifies to join the base metals together. That is, the brazing material is used as an adhesive, so that coalescence can be produced without the base metals being melted. Examples of usable brazing materials include bronze and phosphor copper.

As shown in FIG. 1, the laser brazing system 1 according to the present embodiment includes a robot 12, a laser processing head 13, a wire feed nozzle 14, a laser oscillator 15, a gas supply device 16, a wire feeder 17, and a robot controller 10. The laser brazing system 1 according to the present embodiment is characterized in that the robot controller 10 collectively controls the laser oscillator 15, the gas supply device 16, and the wire feeder 17 in addition to controlling the robot 12.

The robot 12 has an arm 121. The laser processing head 13 and the wire feed nozzle 14 are supported on a distal end of the arm 121. The robot 12 moves the laser processing head 13 and the wire feed nozzle 14 to a processing site of a workpiece through the robot controller 10, which is described below, controlling servo motors provided in respective joint axes of the arm 121.

The laser processing head 13 is connected to the laser oscillator 15 by an optical fiber 151, and a laser beam L is introduced into the laser processing head 13 through the optical fiber 151. A collimation lens and a focusing lens are provided in the laser processing head 13. The laser beam L emitted from the laser oscillator 15 under control of the robot controller 10 described below is introduced into the laser processing head 13, passes through each of the lenses mentioned above, and is irradiated onto processing points. Examples of usable lasers include a fiber laser and a semiconductor laser.

The laser processing head 13 is connected to the gas supply device 16 by a gas supply pipe 161, and gas G is introduced into the laser processing head 13 through the gas supply pipe 161. The gas G supplied from the gas supply device 16 under control of the robot controller 10 described below is introduced into the laser processing head 13, and then ejected as assist gas toward the processing site. Examples of usable gas include argon.

The wire feed nozzle 14 is attached to the laser processing head 13. The wire feed nozzle 14 feeds a wire W, which is a molten material for brazing, to the processing site. The wire feed nozzle 14 is connected to the wire feeder 17 by a wire feed pipe 171, and the wire W is introduced into the wire feed nozzle 14 through the wire feed pipe 171. The wire W fed from the wire feeder 17 under control of the robot controller 10 described below is fed from the wire feed nozzle 14 toward the processing site.

The robot controller 10 controls the robot 12, and collectively controls the laser oscillator 15, the gas supply device 16, and the wire feeder 17. This is a characteristic configuration, in contrast to that of the conventional laser brazing system in which the robot controller and the external device such as a PLC that controls devices such as the laser oscillator and the wire feeder are separately provided. This configuration helps avoid a communication delay and accurately synchronize control of the irradiation of the laser beam L, the supply of the gas G, and the feeding of the wire W with control of the driving of the robot 12. The robot controller 10 includes, for example, a computer having a CPU, memory, and the like.

Specifically, the robot controller 10 causes the laser processing head 13 and the wire feed nozzle 14 supported on the distal end of the arm 121 to move to the processing site, by controlling the servo motors provided in the respective joint axes of the arm 121 of the robot 12. The robot controller 10 controls, for example, laser preheating conditions, preheating start/end timing, laser power conditions, and laser power increase/decrease and timing thereof by controlling the laser oscillator 15. The robot controller 10 controls, for example, gas flow rate and gas flow rate change timing by controlling the gas supply device 16. The robot controller 10 controls, for example, feed speed and feed timing for the wire W by controlling the wire feeder 17.

The robot controller 10 according to the present embodiment has a control panel 11 that includes a display unit 112 enabled to display the state of at least one of the wire feeder 17, the gas supply device 16, or the laser oscillator 15. The display unit 112 has a liquid crystal screen. With the display unit 112, the laser brazing system 1 can collectively display the state of the wire feeder 17, the state of the gas supply device 16, and the state of the laser oscillator 15, as well as the state of the robot 12. Thus, an operator can know the state of each device and the state of the robot 12 all at once.

The control panel 11 includes an input unit 111 for the operator to operate to input setting values. The input unit 111 includes, for example, a keyboard or a touch panel integrated with the display unit 112. The operator can set at least one of the following by operating the input unit 111: a gas flow rate command, a gas flow rate command timing, a wire feed command, a wire feed command timing, a laser preheating command, a laser preheating command timing, a laser power command, a laser power command timing, and a laser power increase/decrease command.

The control panel 11 also allows a forward rotation command for the wire W and a backward rotation command for the wire W to be set through the operator's operation. Thus, the operator can cause forward rotation or backward rotation of the wire W by operating the control panel 11 in a situation in which the wire W is sticking to the workpiece, for example, thereby quickly avoiding trouble from the sticking and reducing problems such as defective processing.

Furthermore, the control panel 11 allows a turn-on command and a turn-off command for guide light (not shown) of the laser oscillator 15 to be set through the operator's operation. Thus, the operator can give more exact teaching, for example, by operating the control panel 11, and thus turning on/off the guide light of the laser oscillator 15 during the teaching.

Figure 2:
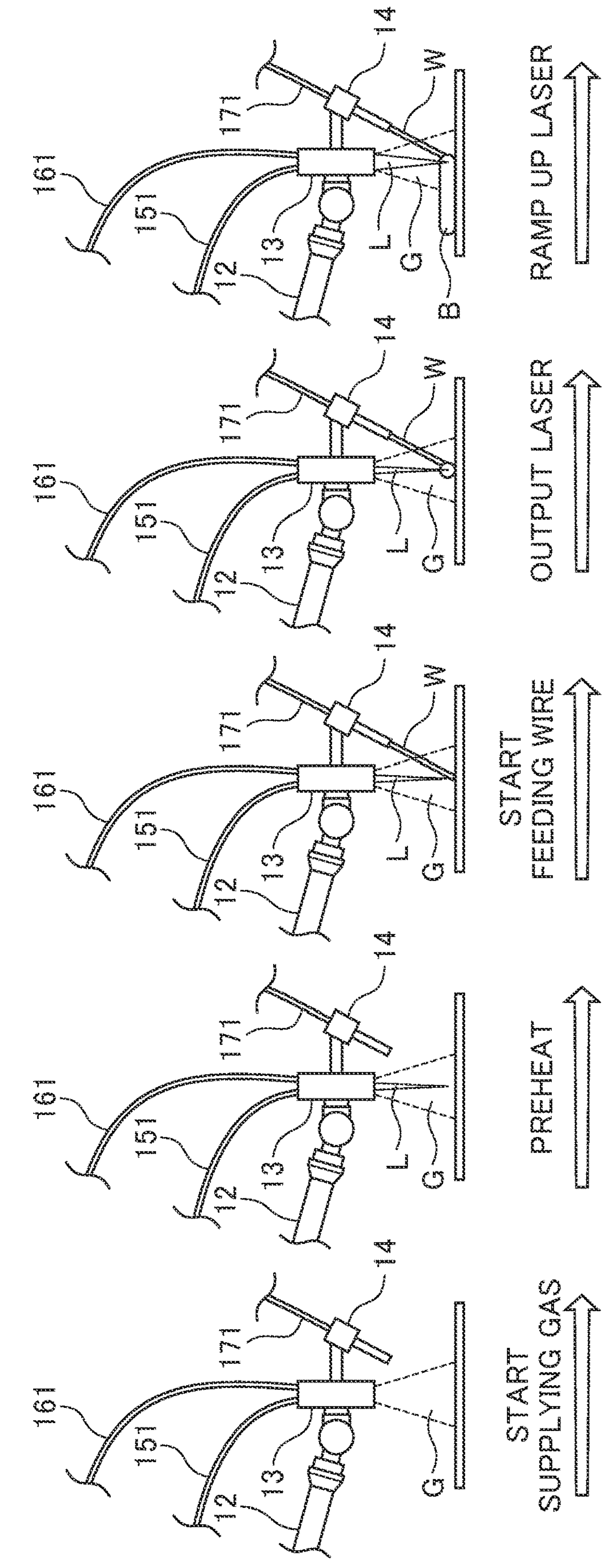
FIG. 2 is a diagram showing a general laser brazing initiation sequence.

FIG. 2 is a diagram showing a general laser brazing initiation sequence. As shown in FIG. 2, first, the robot 12 is controlled to move the laser processing head 13 and the wire feed nozzle 14 supported on the distal end of the arm 121 to the vicinity of the processing site, and then the gas supply device 16 is controlled to start supplying the gas G. Next, the laser oscillator 15 is controlled to start preheating the laser beam L, and then the wire feeder 17 is controlled to feed the wire W to processing points. The laser oscillator 15 is then controlled to start outputting the laser beam L, and the output is increased by ramping up the laser beam L to melt the wire W, ensuring that a brazing process is reliably performed under blast of the gas G.

Figure 3:
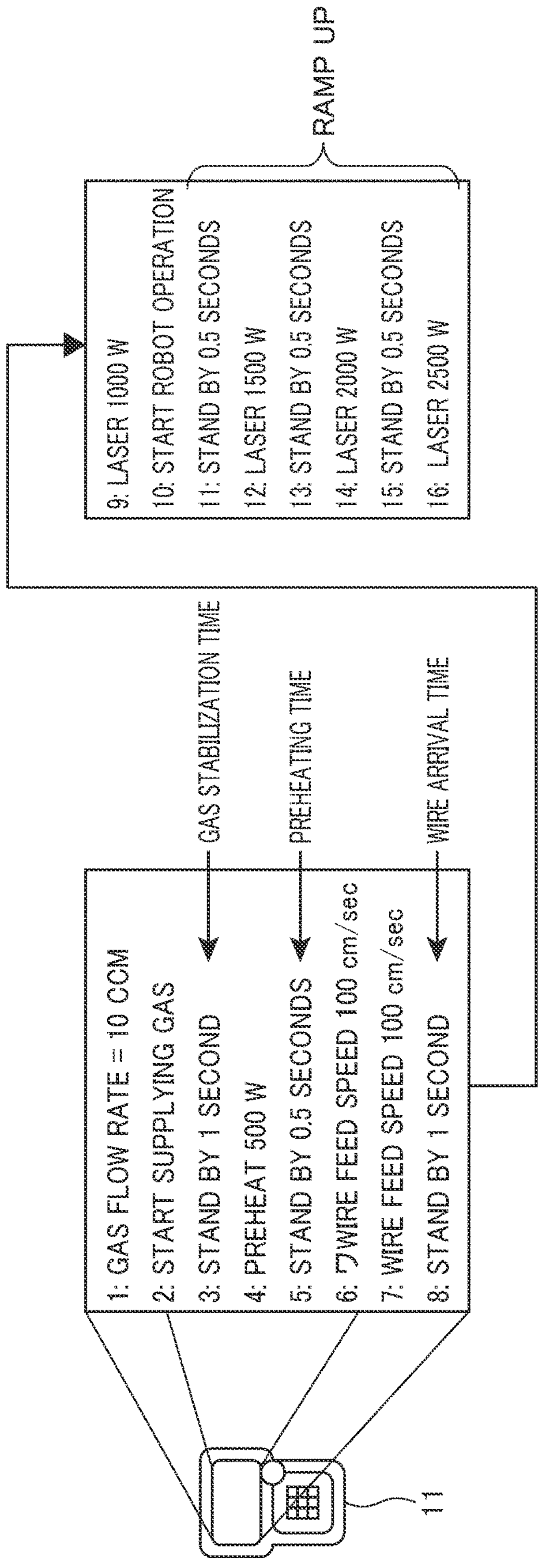
FIG. 3 is a diagram showing an example of a robot program in which the initiation sequence shown in FIG. 2 is written by a conventional general writing method.

FIG. 3 is a diagram showing an example of a robot program in which the initiation sequence shown in FIG. 2 is written by a conventional general writing method. As shown in FIG. 3, writing a robot program by the conventional general writing method requires complex programming over multiple lines. Specifically, a plurality of commands such as for a gas stabilization time, a preheating time, a wire arrival time, and ramp-up conditions need to be programmed over multiple lines, and only a skilled programmer familiar with robot programming can easily do such programming. Furthermore, because of its complexity, the programming provides poor viewability, and therefore the programmer easily omits some teaching by mistake or makes an error in the execution order.

To respond to such problems, the present embodiment preferably has a configuration in which the sequence for laser brazing is set and made executable through a robot program made up of a single-line instruction. FIG. 4 is a diagram showing an example of the robot program according to the present embodiment in which the initiation sequence shown in FIG. 2 is written in a single-line instruction. In this case, the robot controller 10 is configured to control the wire feeder 17, the gas supply device 16, and the laser oscillator 15 through a robot program in which the gas flow rate command, the gas flow rate command timing, the wire feed command, the wire feed command timing, the laser preheating command, the laser preheating command timing, the laser power command, the laser power command timing, and the laser power increase/decrease command (ramping up) are written in a single-line instruction. Thus, the above-described problems are solved.

Figure 5:
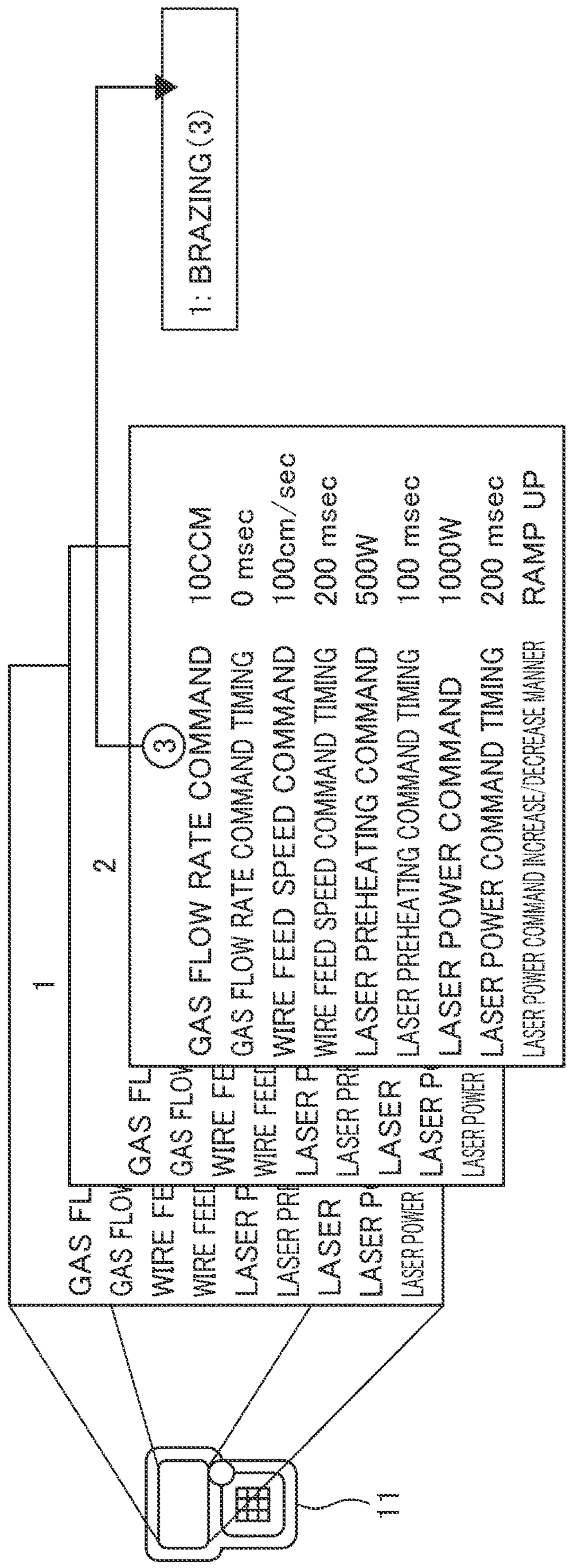
FIG. 5 is a diagram showing an example of a robot program according to the embodiment of the present disclosure written in a single-line instruction for calling up a plurality of tables in which the initiation sequence shown in FIG. 2 is defined.

Preferably, the present embodiment alternatively has a configuration in which setting tables are prepared, and the sequence for laser brazing is set and made executable through a robot program made up of a single-line instruction for simply specifying a setting table number. FIG. 5 is a diagram showing an example of a robot program according to the present embodiment written in a single-line instruction for calling up a plurality of tables in which the initiation sequence shown in FIG. 2 is defined. In the example shown in FIG. 5, a setting table number 3 is called up and executed among setting tables in which laser brazing under three different sets of conditions is predefined and contained.

In this case, the robot controller 10 is configured to control the wire feeder 17, the gas supply device 16, and the laser oscillator 15 through a robot program written in a single-line instruction for calling up a plurality of tables in which the gas flow rate command, the gas flow rate command timing, the wire feed command, the wire feed command timing, the laser preheating command, the laser preheating command timing, the laser power command, the laser power command timing, and the laser power increase/decrease command are specified as conditions that vary from table to table. Thus, the above-described problems are solved.

Figure 6:
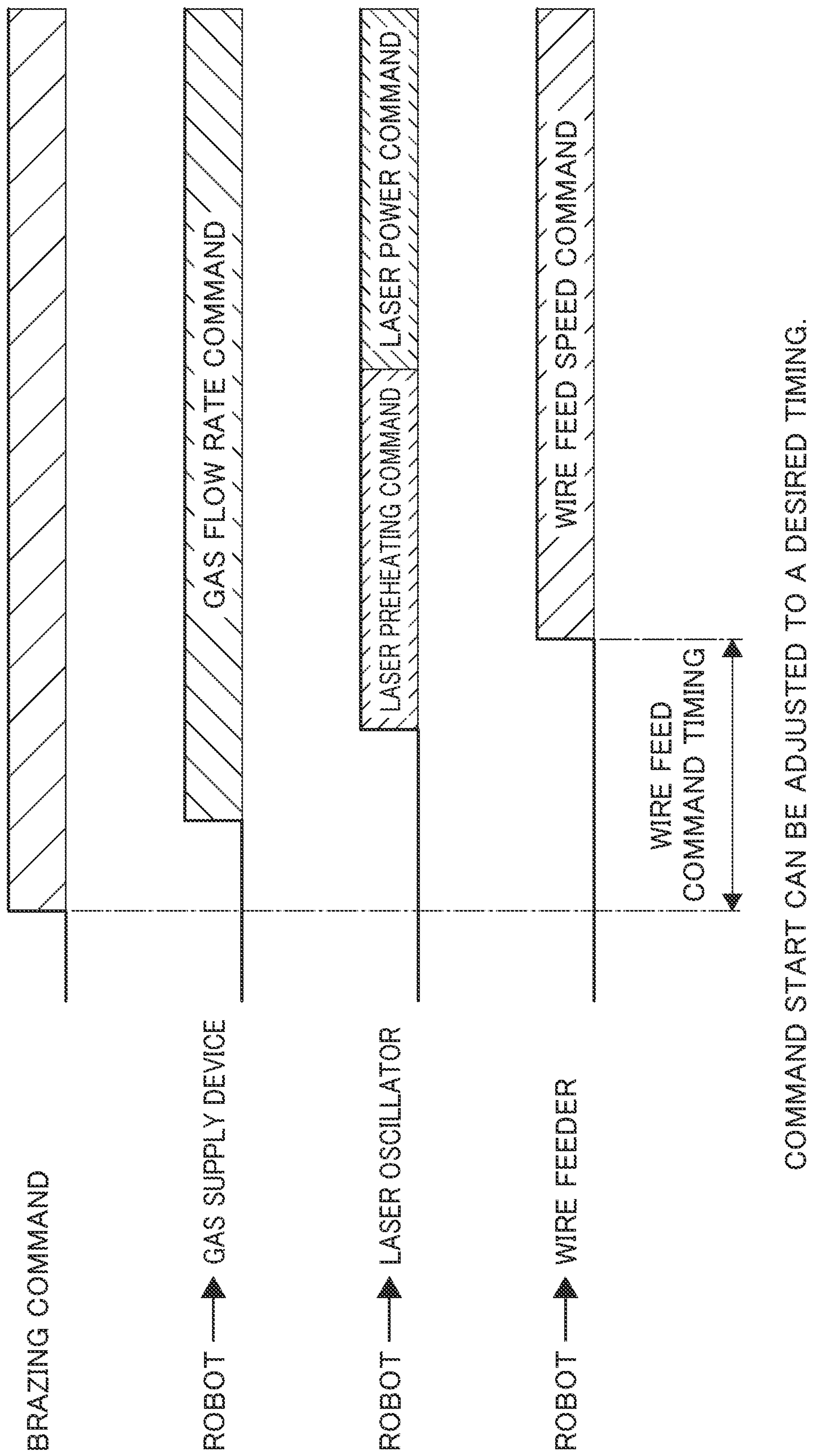
FIG. 6 is an example of a timing diagram showing the initiation sequence of the laser brazing system according to the embodiment of the present disclosure.

FIG. 6 is an example of a timing diagram showing the initiation sequence of the laser brazing system according to the present embodiment. As described above, in the case of the general laser brazing initiation sequence, a gas flow rate command, a laser preheating command, a wire feed speed command, and a laser power command are outputted in turn upon an output of a laser brazing initiation command. Note here that the robot controller 10 according to the present embodiment is configured to execute each of the gas flow rate command, the wire feed command, the laser preheating command, and the laser power command as an independent timing by controlling the wire feeder 17, the gas supply device 16, and the laser oscillator 15. It is therefore possible to change or adjust, for example, the wire feed command to a desired timing as shown in FIG. 6.

It should be noted that the description given above takes an initiation sequence for laser brazing as an example, but the present embodiment is not limited to the initiation sequence. The present embodiment is applicable equally to a termination sequence for laser brazing.

The laser brazing system 1 according to the present embodiment produces the following effects. According to the present embodiment, the robot controller 10 controls the wire feeder 17, the gas supply device 16, and the laser oscillator 15 in addition to controlling the robot 12. The robot controller 10 also has the display unit 112 enabled to display the state of at least one of the wire feeder 17, the gas supply device 16, or the laser oscillator 15.

As such, the robot controller 10 is directly connected to the wire feeder 17, the gas supply device 16, and the laser oscillator 15 without involving an external device such as a PLC, for example, allowing for direct control over the devices using the robot controller 10 and a reduction in the communication delay compared to conventional systems involving an external device such as a PLC. That is, with the robot controller 10, the laser brazing system 1 can collectively control the devices in addition to the robot 12, making it possible to accurately synchronize control of the irradiation of the laser beam L, the supply of the gas G, and the feeding of the wire W with control of the driving of the robot 12.

Since the robot controller 10 has the display unit 112 enabled to display the state of at least one of the wire feeder 17, the gas supply device 16, or the laser oscillator 15, the laser brazing system 1 can collectively display the state of the wire feeder 17, the state of the gas supply device 16, and the state of the laser oscillator 15, as well as the state of the robot 12. Consequently, the operator can know the state of each device and the state of the robot 12 all at once.

Furthermore, the robot controller 10 according to the present embodiment is configured to control the devices (the wire feeder 17, the gas supply device 16, and the laser oscillator 15) through a robot program in which the gas flow rate command, the gas flow rate command timing, the wire feed command, the wire feed command timing, the laser preheating command, the laser preheating command timing, the laser power command, the laser power command timing, and the laser power increase/decrease command (ramping up) are written in a single-line instruction.

Alternatively, the robot controller 10 is configured to control the devices (the wire feeder 17, the gas supply device 16, and the laser oscillator 15) through a robot program written in a single-line instruction for calling up a plurality of tables in which the gas flow rate command, the gas flow rate command timing, the wire feed command, the wire feed command timing, the laser preheating command, the laser preheating command timing, the laser power command, the laser power command timing, and the laser power increase/decrease command are specified as conditions that vary from table to table.

Thus, even a programmer who is not a skilled programmer familiar with robot programming can easily do such programming. Furthermore, because of its simplicity, the programming provides better viewability, and therefore the programmer can avoid mistakenly omitting some teaching or making an error in the execution order.

It should be noted that the present disclosure is not limited to the foregoing embodiment, and encompasses modifications and improvements to the extent that the object of the present disclosure is achieved.

For example, the display unit 112 is provided in the control panel 11 in the foregoing embodiment. However, the display unit 112 is not limited as such. For example, the display unit 112 may be provided directly in the robot controller 10.

For another example, the foregoing embodiment has a configuration in which commands can be set via the control panel 11. However, the foregoing embodiment may have a configuration in which the robot controller 10 additionally or alternatively has a reception unit 3 that receives at least one of the gas flow rate command, the gas flow rate command timing, the wire feed command, the wire feed command timing, the laser preheating command, the laser preheating command timing, the laser power command, the laser power command timing, or the laser power increase/decrease command, from an external device 2 via a network 4.

EXPLANATION OF REFERENCE NUMERALS

1: Laser brazing system
10: Robot controller
11: Control panel
111: Input unit
112: Display unit
12: Robot
121: Arm
13: Laser processing head
14: Wire feed nozzle
15: Laser oscillator
16: Gas supply device
17: Wire feeder
G: Gas
L: Laser beam
W: Wire

The invention claimed is:

1. A laser brazing system comprising:

a gas supply device configured to supply gas;

a wire feeder configured to feed a wire;

a laser oscillator configured to lase;

a robot having an arm that supports, on a distal end thereof, a wire feed nozzle and a laser processing head; and a robot controller configured to control the robot, wherein the robot controller includes a processor including memory that stores a robot program, and, when executing the robot program, the processor is configured to:

control, in addition to the robot, the wire feeder, the gas supply device, and the laser oscillator, and display a state of at least one of the wire feeder, the gas supply device, or the laser oscillator, allow an operator to operate to set at least one of a gas flow rate command, a gas flow rate command timing, a wire feed command, a wire feed command timing, a laser preheating command, a laser preheating command timing, a laser power command, a laser power command timing, or a laser power increase/decrease command, and control the wire feeder, the gas supply device, and the laser oscillator through the robot program in which the gas flow rate command, the gas flow rate command timing, the wire feed command, the wire feed command timing, the laser preheating command, the laser preheating command timing, the laser power command, the laser power command timing, and the laser power increase/decrease command are written in a single-line instruction.

2. The laser brazing system according to claim 1, wherein the processor is configured to execute each of the gas flow rate command timing, the wire feed command timing, the laser preheating command timing, and the laser power command timing as an independent timing by controlling the wire feeder, the gas supply device, and the laser oscillator.

3. The laser brazing system according to claim 1, wherein the processor has a reception unit enabled to receive at least one of the gas flow rate command, the gas flow rate command timing, the wire feed command, the wire feed command timing, the laser preheating command, the laser preheating command timing, the laser power command, the laser power command timing, or the laser power increase/decrease command, from an external device via a network.

4. The laser brazing system according to claim 1, wherein the processor allows a forward rotation command for the wire and a backward rotation command for the wire to be set through the operator's operation.

5. The laser brazing system according to claim 1, wherein the processor allows a turn-on command for guide light of the laser oscillator and a turn-off command for the guide light to be set through the operator's operation.

6. A laser brazing system comprising:

a gas supply device configured to supply gas;

a wire feeder configured to feed a wire;

a laser oscillator configured to lase;

a robot having an arm that supports, on a distal end thereof, a wire feed nozzle and a laser processing head; and a robot controller configured to control the robot, wherein the robot controller includes a processor including memory that stores a robot program, and, when executing the robot program, the processor is configured to:

control, in addition to the robot, the wire feeder, the gas supply device, and the laser oscillator, and display a state of at least one of the wire feeder, the gas supply device, or the laser oscillator, allow an operator to operate to set at least one of a gas flow rate command, a gas flow rate command timing, a wire feed command, a wire feed command timing, a laser preheating command, a laser preheating command timing, a laser power command, a laser power command timing, or a laser power increase/decrease command, and control the wire feeder, the gas supply device, and the laser oscillator through the robot program written in a single-line instruction for calling up a plurality of tables in which the gas flow rate command, the gas flow rate command timing, the wire feed command, the wire feed command timing, the laser preheating command, the laser preheating command timing, the laser power command, the laser power command timing, and the laser power increase/decrease command are specified as conditions that vary from table to table.

7. The laser brazing system according to claim 6, wherein the processor is configured to execute each of the gas flow rate command timing, the wire feed command timing, the laser preheating command timing, and the laser power command timing as an independent timing by controlling the wire feeder, the gas supply device, and the laser oscillator.

8. The laser brazing system according to claim 6, wherein the processor has a reception unit enabled to receive at least one of the gas flow rate command, the gas flow rate command timing, the wire feed command, the wire feed command timing, the laser preheating command, the laser preheating command timing, the laser power command, the laser power command timing, or the laser power increase/decrease command, from an external device via a network.

9. The laser brazing system according to claim 6, wherein the processor allows a forward rotation command for the wire and a backward rotation command for the wire to be set through the operator's operation.

10. The laser brazing system according to claim 6, wherein the processor allows a turn-on command for guide light of the laser oscillator and a turn-off command for the guide light to be set through the operator's operation.

* * * * *